W. J. STAHR.
DEVICE FOR AUTOMATICALLY COMPENSATING FOR WEAR OF BRAKE SHOES.
APPLICATION FILED APR. 25, 1917.

1,244,388.

Patented Oct. 23, 1917.

Witness
R. A. Thomas
J. W. Sherwood

Inventor.
W. J. Stahr
By Frankel & Noah
attorney

W. J. STAHR.
DEVICE FOR AUTOMATICALLY COMPENSATING FOR WEAR OF BRAKE SHOES.
APPLICATION FILED APR. 25, 1917.
1,244,388.
Patented Oct. 23, 1917.
2 SHEETS—SHEET 2.
FIG. 2.
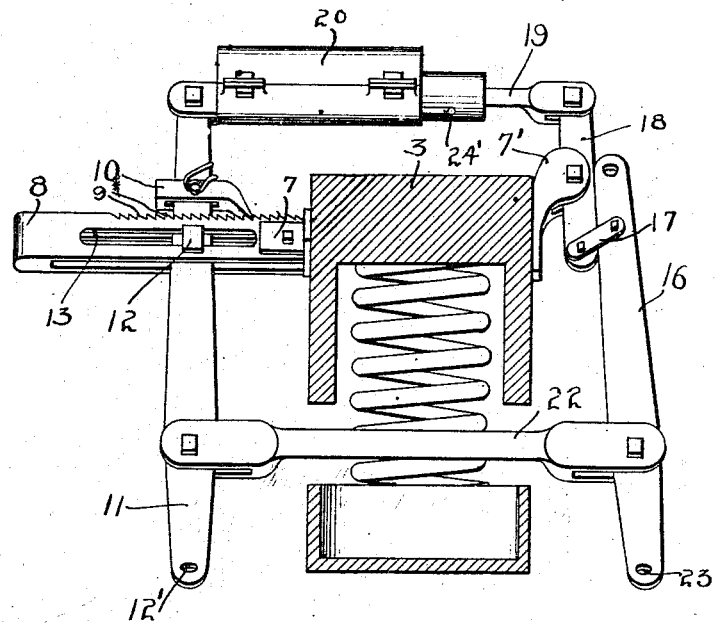
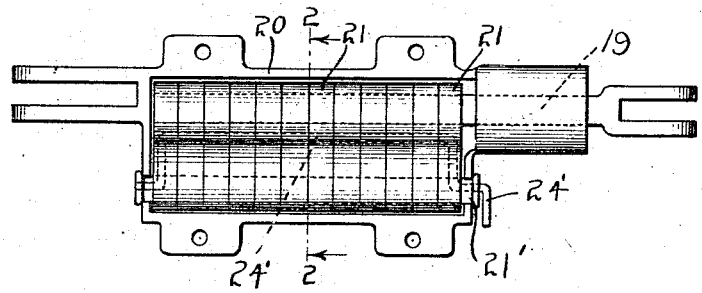
FIG. 7.
FIG. 8.
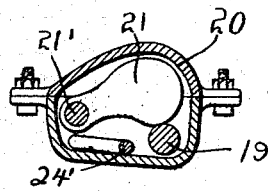
Witness
R. A. Thomas
J. W. Sherwood
Inventor.
W. J. Stahr
By Frank H. Noyh
Attorney

UNITED STATES PATENT OFFICE.

WILLIAM J. STAHR, OF NESCOPECK, PENNSYLVANIA.

DEVICE FOR AUTOMATICALLY COMPENSATING FOR WEAR OF BRAKE-SHOES.

1,244,388.  Specification of Letters Patent.  Patented Oct. 23, 1917.

Application filed April 25, 1917. Serial No. 164,513.

*To all whom it may concern:*

Be it known that I, WILLIAM J. STAHR, a citizen of the United States, residing at Nescopeck, in the county of Luzerne and State of Pennsylvania, have invented certain new and useful Improvements in Devices for Automatically Compensating for Wear of Brake-Shoes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in railway rolling stock and more particularly to the brake mechanism thereof.

The important feature of the invention resides in the provision of a wear compensating mechanism for compensating for wear on the brake shoes. A further object of the invention is to provide an attachment adapted to be attached to the ordinary car truck now in use and one which operates automatically.

The invention comprises various details of construction, combinations and arrangements of parts which will be hereinafter fully described, shown in the accompanying drawings and then specifically defined in the appended claims.

My invention is illustrated in the accompanying drawings, in which:

Fig. 2 is a sectional view through the bolster of a car truck with the invention applied thereto.

Fig. 7 is a plan view of the pivoted stop casing with the cover removed, and

Fig. 8 is a sectional view taken on line 2—2 of Fig. 7.

Figure 1:
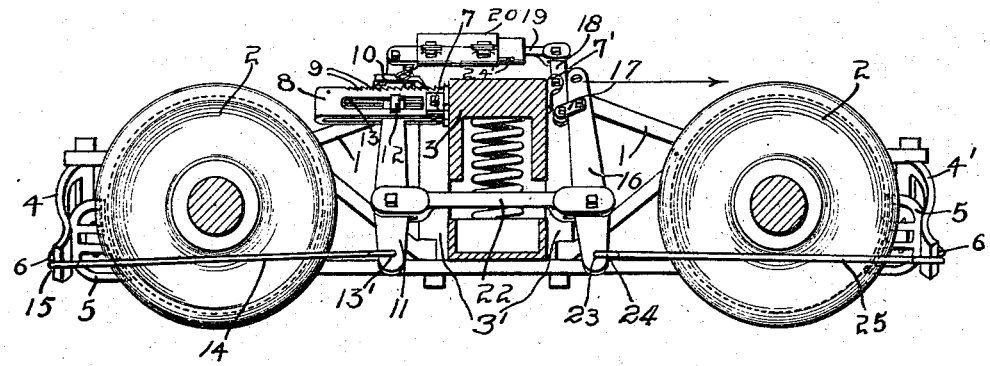
Figure 1 is a sectional view taken through a car truck with the present invention applied thereto.
Figure 3:
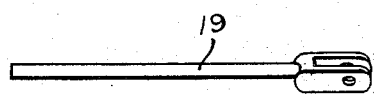
Fig. 3 is a detail view of a stop bar.
Figure 4:
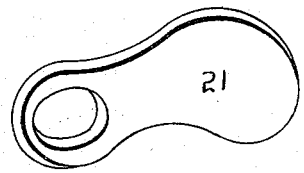
Fig. 4 is a perspective view of one of the pivoted stops.
Figure 5:
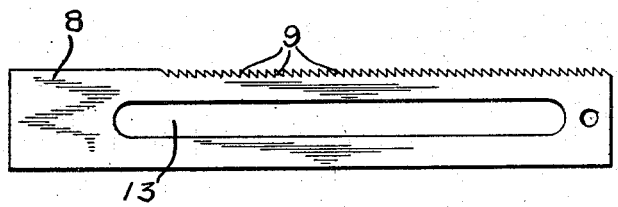
Fig. 5 is a side elevation of one of the rack bars.
Figure 6:
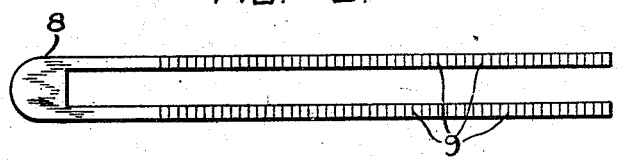
Fig. 6 is a plan view of the rack bar.

Reference now being had to the details of the drawings by numeral, 1 indicates the side structures of the frame of the truck between which operate the wheels 2 supporting the truck and between which the usual bolster 3 is supported.

Pivotally connected to the ends of the side structures 1 are the pivotally supported brake shoe supports 4 and 4' which carry the brake shoes 5, normally held away from the wheels 2 by the tension of the spring 6. Apertured lugs 7 and 7' are secured to the opposite sides of the bolster 3 which is guided by columns 3' and between the lugs 7 is a rack bar 8 having teeth 9 formed on the upper surface thereof, said teeth coöperating with the pivoted pawl 10, supported on the lever 11, for holding the latter in various adjusted positions. Said lever has laterally extending pins 12 operating in slots 13 formed in the rack bar 8 forming a guide therefor.

Adjacent the lower end of the lever 11 is an aperture 12' through which extends the end 13' of the rod 14, the opposite ends of said rod 14 being connected at 15 to the shoe support and communicates movement thereto, to move the brake shoe supports against the tension of the springs 6.

A lever 16, which is a duplicate of the lever 11 and operates on the opposite side of the bolster 3, is connected thereto by means of the links 17 connected to the lever 18 at one end thereof, the central portion of the lever 18 being pivotally connected to lugs 7'. The upper end of said lever 18 has pivotal connection with the stop rod 19, operating within the casing 20, housing the pivoted stops 21 pivoted on the shaft 21' and it will be seen that the stop rod 19 normally lies in a position under the pivoted stops 21 but, when the rod 19 is moved in one direction or from under one or more of the stops 21, said stops fall downwardly within the path of travel of stop rod 19 on its return movement and consequently shorten the stroke of rod 19.

A bar 22 has its ends pivotally connected to the levers 11 and 16, which supports the levers 11 and 16 in spaced relation. The lower end of the lever 16 is also provided with an opening 23, through which passes the part 24 of rod 25, the opposite ends thereof passing through the brake shoe supports 4 of the opposite ends of the side frames. The upper end of the lever 16 is suitably connected to the usual air brake structure of the car and it will be seen that, when the lever 16 is moved in the direction of the arrow, the lower end thereof moves the rods 25, which bring the shoes carried by supports 41 into engagement with their respective wheels 2.

In the operation of the device, it is obvious that, when the upper end of the lever 16 is moved in the direction of the arrow, the upper end of the lever 18 is moved in the opposite direction, with the result that the stop bar 19 engages one of the pivoted stops 21 and moves the bar 11 to apply the brakes, while the pawl 10 moves over the teeth 9 and shortens the leverage of said levers 11 and 16 and it follows that the wear on the brake shoes is in this way compensated for.

When the brake shoes are again worn to a noticeable degree, the rod 19 moves from the casing 20 with the result that another pivoted stop falls within the path of travel of the rod 19 on the return movement thereof, thereby moving the pawl 10 again along the rack bar 8 and again shortening the leverage of levers 11 and 16. If new shoes are applied to the members 4 and 4', it is, of course, necessary to reset the stop rod 19 and, to accomplish this result, it is only necessary to swing rod 24' upwardly and raise said pivoted stops above the rod 19, as shown in Fig. 8 of the drawings.

While I have shown the invention as applied to a car truck, it is, of course, obvious that the device may be applied to various types of movable vehicles with equally good results.

What I claim to be new is:—

1. In combination with a car truck and the brake shoe supports thereof, vertical levers pivoted to opposite sides of the bolster of the truck, one of said levers having connection with an air brake apparatus, means for connecting the lower ends of the levers and the brake shoe supports, whereby movement of the levers produces a relative movement of the brake shoe supports, and means connecting the upper ends of the levers for automatically shortening the strokes of the levers.

2. In combination with a car truck and the brake shoe supports thereof, vertical levers pivoted to the opposite sides of the bolster of the truck, the lower ends of said levers having connection with the brake shoe supports, a rack bar pivoted adjacent the upper end of one of said vertical levers, means for connecting the upper ends of the vertical levers, means for connecting the levers adjacent the lower end thereof, and means carried by the upper end of one of said levers and cooperating with the rack bar for shortening the stroke of said levers when the brake shoe supports are moved in one direction.

3. In combination with a car truck and the brake shoe supports thereof, vertical levers pivoted to the opposite sides of the bolster of the truck, means for supporting the levers, the lower ends of said levers having communication with the brake shoe supports to communicate movement thereto, a housing pivotally supported to the upper end of one of said vertical levers, a plurality of pivoted stops supported within the housing, a stop rod having pivotal connection with the upper end of the opposite vertical lever and operating within the housing, said stop rod adapted to normally lie under the pivoted stops, said stop bar adapted to move from under one or more stops when the lever to which the same is connected is moved in one direction, and means for holding the rod in such position.

4. In combination with a car truck and the brake shoe supports thereof, vertical levers pivoted to opposite sides of the bolster of the truck, the lower ends of said levers having connection with the brake shoe supports for causing movement thereof, a housing pivotally connected to the upper end of one of said vertical levers, a slidable rod having pivotal connection with the upper end of the opposite lever, means in the housing and cooperating with one end of said rod for automatically shortening the leverage of said vertical levers when the brake is applied, and means for holding the rod and housing in their positions of adjustment.

5. In combination with a car truck and the brake shoe supports thereof, vertical levers pivoted to opposite sides of the bolster of the truck, the lower ends of said levers having connection with the shoe supports thereof, means connecting the upper ends of the vertical levers for adjusting the leverage thereof, and means for holding the levers in their positions of adjustment.

In testimony whereof I hereunto affix my signature in presence of two witnesses.

WILLIAM J. STAHR.

Witnesses:
M. C. BOND,
G. H. LUDWIG.

Copies of this patent may be obtained for five cents each, by addressing the "Commissioner of Patents, Washington, D. C."